United States Patent [19]

Aldenhoven et al.

[11] Patent Number: 4,748,523
[45] Date of Patent: May 31, 1988

[54] MAGNETIC-TAPE APPARATUS WITH COMBINED TAPE AND SERVO WHEEL DRIVE

[75] Inventors: Ghislanus M. A. M. Aldenhoven; Joseph G. Laudus, both of Hasselt, Belgium

[73] Assignee: U.S. Philips Corp., New York, N.Y.

[21] Appl. No.: 885,352

[22] Filed: Jul. 14, 1986

[30] Foreign Application Priority Data

Jul. 17, 1985 [NL] Netherlands .......................... 8502056

[51] Int. Cl.$^4$ ............................................. G11B 5/54
[52] U.S. Cl. .................................... 360/105; 360/96.3
[58] Field of Search .................. 360/85, 95, 96.1–96.4, 360/105; 242/197–200

[56] References Cited

U.S. PATENT DOCUMENTS 4,611,251 9/1986 Yokoo .............................. 360/95 X Primary Examiner—A. J. Heinz
Attorney, Agent, or Firm—David R. Treacy

[57] ABSTRACT

A magnetic-tape apparatus comprises at least one switching device comprising a servo wheel (77; 97) for switching an apparatus function. Further, the apparatus comprises two winding spindles (2, 3) whose lower end portions are each connected to a coaxial winding wheel (4, 5). A reversible drive motor (22), which can be operated at a high and a low torque level, is coupled to the respective winding wheel (4, 5) via a pivotable idler (27) mounted between the winding wheels (4, 5) after the idler has been pivoted to an operating position of the apparatus. In a switching position of the apparatus, the motor (72) is coupled to a coupling device (22). In the switching position of the apparatus this coupling wheel establishes a coupling between the motor (22) and the switching device (77; 97), so that this device is actuated to switch the apparatus function. The motor (22) can actuate the switching device (77; 97) only when it operates at the higher torque level.

19 Claims, 10 Drawing Sheets

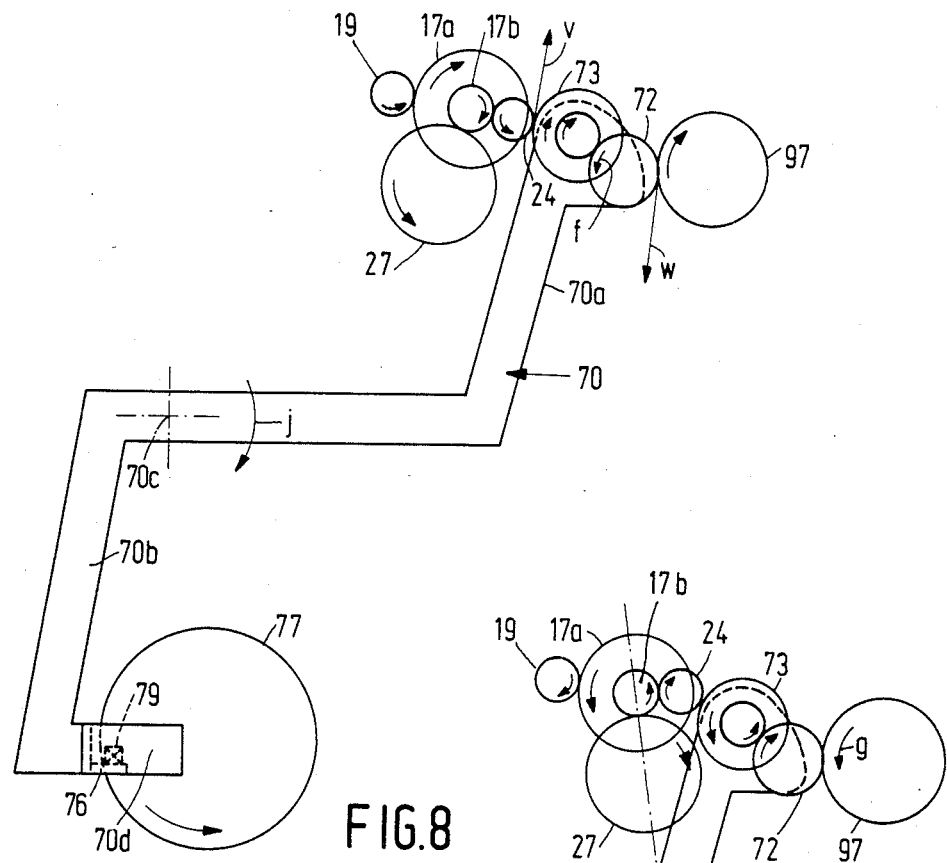
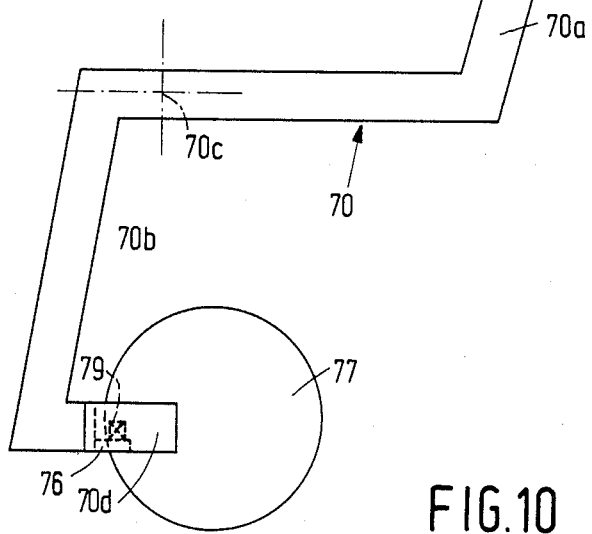

MAGNETIC-TAPE APPARATUS WITH COMBINED TAPE AND SERVO WHEEL DRIVE

BACKGROUND OF THE INVENTION

The invention relates to a magnetic-tape apparatus with at least one switching device comprising a servo wheel for switching an apparatus function and more particularly to such apparatus having two winding spindles whose lower end portions are each connected to a coaxial winding wheel, and a reversible drive motor which in an operating condition of the apparatus is coupled to the respective winding wheel by means of an idler wheel which is pivotably arranged between the winding idlers. In a switching condition of the apparatus, the idler wheel is coupled to a coupling wheel which constitutes a coupling between the drive motor and switching device. This coupling results in the switching device being activated to switch the apparatus function.

A magnetic-tape apparatus of this kind is known. In this known magnetic-tape apparatus the switching device comprises an electromechanical transducer comprising an electromagnet constructed as an impulse relay. Further, the switching device comprises a servo member which is actuated by the electromechanical transducer in a first position in which it blocks the servowheel of the switching device against rotation. This blocking ensures that the apparatus function cannot be switched on. By electrically energizing the electromechanical transducer the servo member is moved to a second position under spring force, allowing the servo wheel to rotate. Thus, under the influence of the electromechanical transducer the switching device is actuated and subsequently the apparatus function is switched. This electromechanical transducer used in the known apparatus is a part which occupies a certain space inside the apparatus, which must be mounted separately on the deck, and which must also be connected electrically.

SUMMARY OF THE INVENTION

It is the object of the invention to control the apparatus function in such a magnetic-tape apparatus by means of an electromechanical transducer which is present anyway in such an apparatus, so that a separate electromechanical transducer may be dispensed with.

In accordance with the invention the coupling wheel is arranged on a servo member which is movable between a first position and a second position and which is urged into the first position by the force exerted by a latching spring. In the first position the servo member locks the servo wheel against rotation; and in the second position the servo member releases the servo wheel to switch the apparatus function. The coupling wheel is in contact with an at least temporarily stationary body and, as it rotates in a first direction, it urges the servo member towards the second position by a rolling movement along the body. The force exerted on the servo member by the coupling wheel is large enough to overcome the force of the latching spring only if the motor has been switched to the first or higher of two levels of torque at which the motor can be operated.

Thus, by energizing the drive motor with a comparatively high voltage, to produce a comparatively high torque, the force exerted on the servo member is large enough to overcome the force produced by the latching spring. In this way, the drive motor is capable of setting the servo member to the second position when energized with a higher voltage. If the drive motor is energized with a lower voltage, the latching spring force is not overcome, and the spring ensures that the servo member remains in the first position, so that the servo wheel remains blocked and the switching device remains in the rest position. At this lower voltage the drive motor operates at the comparatively low torque level and, depending on the position of the idler, drives one of the two winding wheels through the pivotable idler to transport the magnetic tape via the respective winding spindle. Thus, when the higher voltage is applied to the drive motor this motor performs the function of an electromechanical transducer for locking and releasing the servo wheel, so that a separate electromechanical transducer may be dispensed with. In this way an optimum use is made of a standard part which is already present in such an apparatus. This not only saves space but it also saves a separate mounting operation and electrical connection.

The relevant apparatus function which is switched by means of the switching device may be the turning of a magnetic head in an apparatus which can operate in two directions of tape transport (referred to as an "auto-reverse" apparatus). However, the apparatus function may alternatively by the positioning of a mounting plate carrying the magnetic heads or the actuation of other devices in such an apparatus.

In another aspect of the invention, to achieve the desired object the drive motor is switchable between two torque levels, the servo wheel is latched by a latching member during rotation of the coupling wheel in a first direction and is released during rotation of the coupling wheel in a second direction. As a result the coupling wheel drives the servo wheel. The switching device comprises a switching member having such an internal friction that the force required for actuating the switching member is produced by the drive motor through the coupling wheel if the motor operates at the first torque level. These steps have the advantage that the drive motor can drive the servo wheel through the coupling wheel during rotation of the coupling wheel in one of the directions, so that the drive motor can actuate the switching device and can thus switch the apparatus function. In this respect it is also important that the switching device is actuated only if the motor is energized with the higher voltage. At this first level of voltage, the motor produces a motor torque which is large enough to overcome the internal friction of the switching member. An example of such an apparatus function is the actuation of a recording switch of the apparatus, whose actuation produces such a friction that this friction can be overcome only if the motor operates at the higher voltage.

If the drive motor can rotate in two opposite directions at the higher voltage, the motor can actuate two separate switching devices depending on the direction of rotation and thus switch two different apparatus functions. In this respect a preferred embodiment of the invention is characterized by comprising both a first switching device and a second switching device. The first device includes a first servo wheel, which is latched by a servo member. The second device includes a second servo wheel, which is latched by the latching member and constitutes the temporarily stationary body. In this way the drive motor can perform a larger number of functions, namely driving the winding spindles for the magnetic tape transport in the first direction and the second direction respectively, and switching a first apparatus function and a second apparatus function by means of the first switching device and the second switching device respectively.

A further preferred embodiment of the invention is characterized in that, in addition to the coupling wheel, the servo member also carries an axially movable switching wheel which is arranged in the transmission from the drive motor to the coupling wheel and after it has been moved to an inoperative position interrupts the drive of the coupling wheel. By driving the coupling wheel by the motor via a movable switching wheel, it is possible to interrupt the drive of the coupling wheel and hence of the switching devices. This has the advantage that after the drive of the coupling wheel has been interrupted the drive motor can drive the winding wheels and consequently the winding spindles also at the higher voltage. This is desirable for fast winding of the magnetic tape. At the lower voltage the drive motor drives the winding spindles with a torque which is just large enough to take up the magnetic tape during recording or playback. As a result of these steps the drive motor can perform six functions, namely winding the magnetic tape in two opposite directions at the normal tape speed, transport of a tape at high speed in two opposite directions, and switching the first apparatus function and the second apparatus function.

In a further preferred embodiment of the invention, the servo member is constructed as a two-armed lever which is pivotable against the force of the latching spring, the coupling wheel and the switching wheel being situated at the free end of a first arm of the lever. The free end of the second arm keeps the first servo wheel in the latched position. By the use of the two-armed lever it is possible to arrange the coupling wheel and the switching wheel at a comparatively large distance from the servo wheel. Thus, the combination of the coupling wheel and switching wheel may be situated near the pivotable idler wheel, between the respective winding wheels at a first side of the apparatus; while the first servo wheel may be situated near a second opposite side of the apparatus underneath a head-mounting plate. The lever construction also ensures that the force exerted on the servo member by the latching spring is defined accurately. This is important because this force must be large enough to keep the servo member in the latched position relative to the first servo wheel if the motor is operated at the lower voltage, in order to preclude inadvertent switching of the first apparatus function.

In this preferred embodiment at its free end the second arm comprises two latching projections to latch a stop projection on the first servo wheel. These latching projections are radially spaced from each other relative to the axis of rotation of the servo wheel. After every movement of the servo member to the seciond position, the second latching projection is situated in the path of the stop projection and the servo wheel is stopped after actuation of the apparatus function. This is advantageous because the servo wheel returns to the first position with some delay. This return movement is effected under the influence of the latching spring after reversal of the direction of rotation of the motor.

Another preferred embodiment of the invention is characterized in that the head-mounting plate controls first and second positioning means which position the pivotable idler wheel or the switching wheel into an inoperative position depending on the position of the head-mounting plate, the head-mounting plate being situated at a larger distance from the winding spindles when the pivotable idler wheel is inoperative than when the switching wheel is inoperative. The first and the second positioning means ensure that either the idler wheel or the switching wheel is inoperative depending on the position of the head-mounting plate. If the idler wheel is inoperative, in which case the head-mounting plate is preferably in a fully retracted position relative to the cassette, the drive motor can switch the first or the second apparatus function via the switching wheel and the coupling wheel depending on the direction of rotation of the motor. If the switching wheel is in the inoperative position, in which case the head-mounting plate has been moved towards the cassette, the relevant winding spindle is now driven via the pivotable idler wheel so that the magnetic tape can be wound without the risk of an apparatus function being actuated.

Another preferred embodiment of the invention is characterized in that the first switching device turns a magnetic head arranged on the head-mounting plate via the servo wheel and changes over pressure rollers arranged on the head-mounting plate to reverse a direction of tape transport, while the second switching device actuates a recording switch via the servo wheel. In this way the first switching device can turn the magnetic head and change over the pressure rollers by means of the drive motor. This is important for the aforementioned "auto reverse" apparatuses. Further, the drive motor can actuate the recording switch via the second switching device. For switching the two apparatus functions no separate electromechanical transducer is needed.

A magnetic tape apparatus embodying the invention will be described in more detail, by way of example, with reference to the accompanying drawings.

BRIEF DESCRIPTION OF THE DRAWING

FIG. 8 is a schematic plan view of the first switching device during the movement of the servo member from the first position to the second position, FIG. 10 is a schematic plan view of a part of the apparatus during actuation of the second switching device.

DESCRIPTION OF THE PREFERRED EMBODIMENT

Figure 1A:
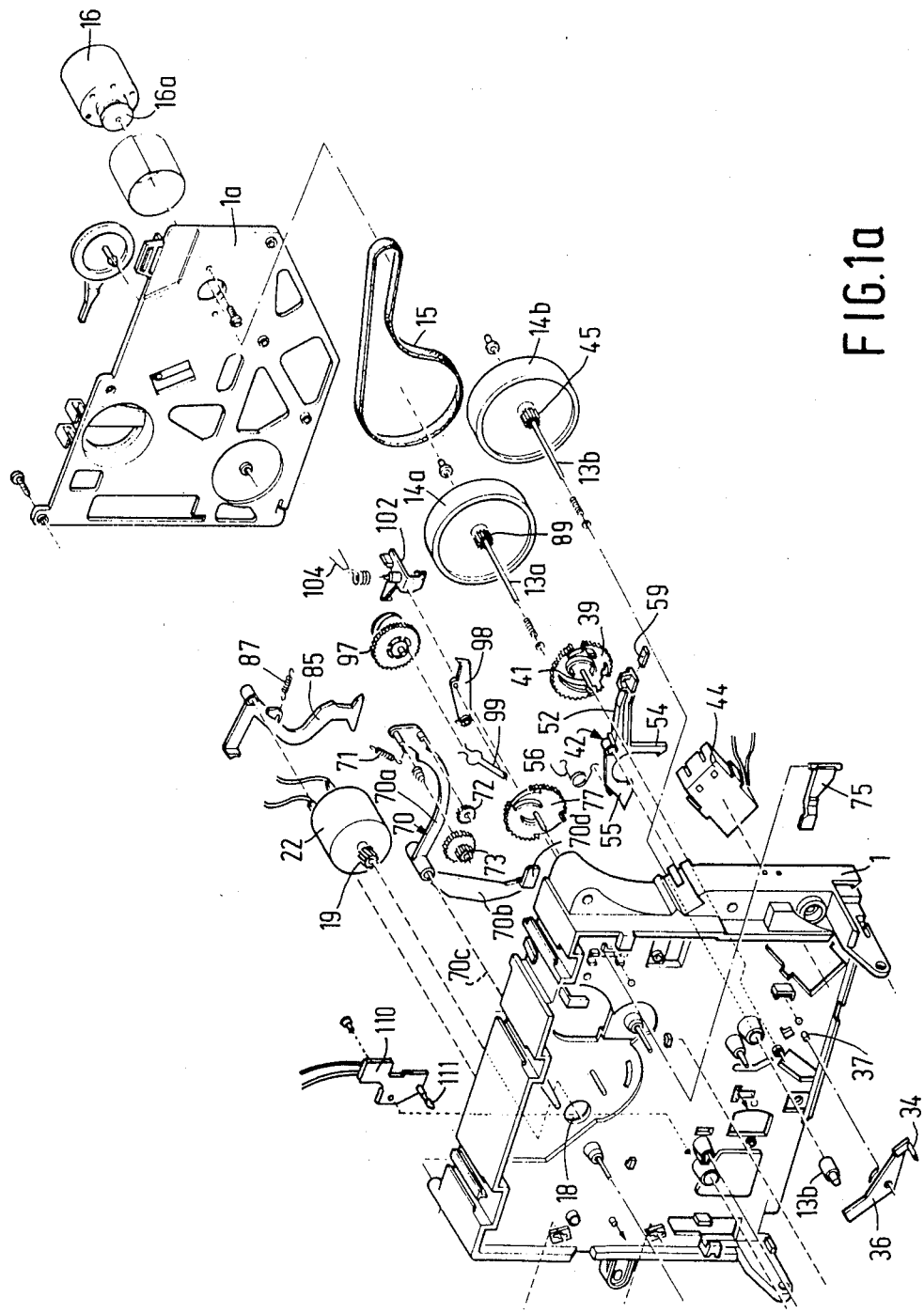
FIGS. 1a and 1b are exploded views of a first part and a second part of a magnetic-tape apparatus in accordance with the invention, which parts together constitute the entire apparatus.
Figure 1B:
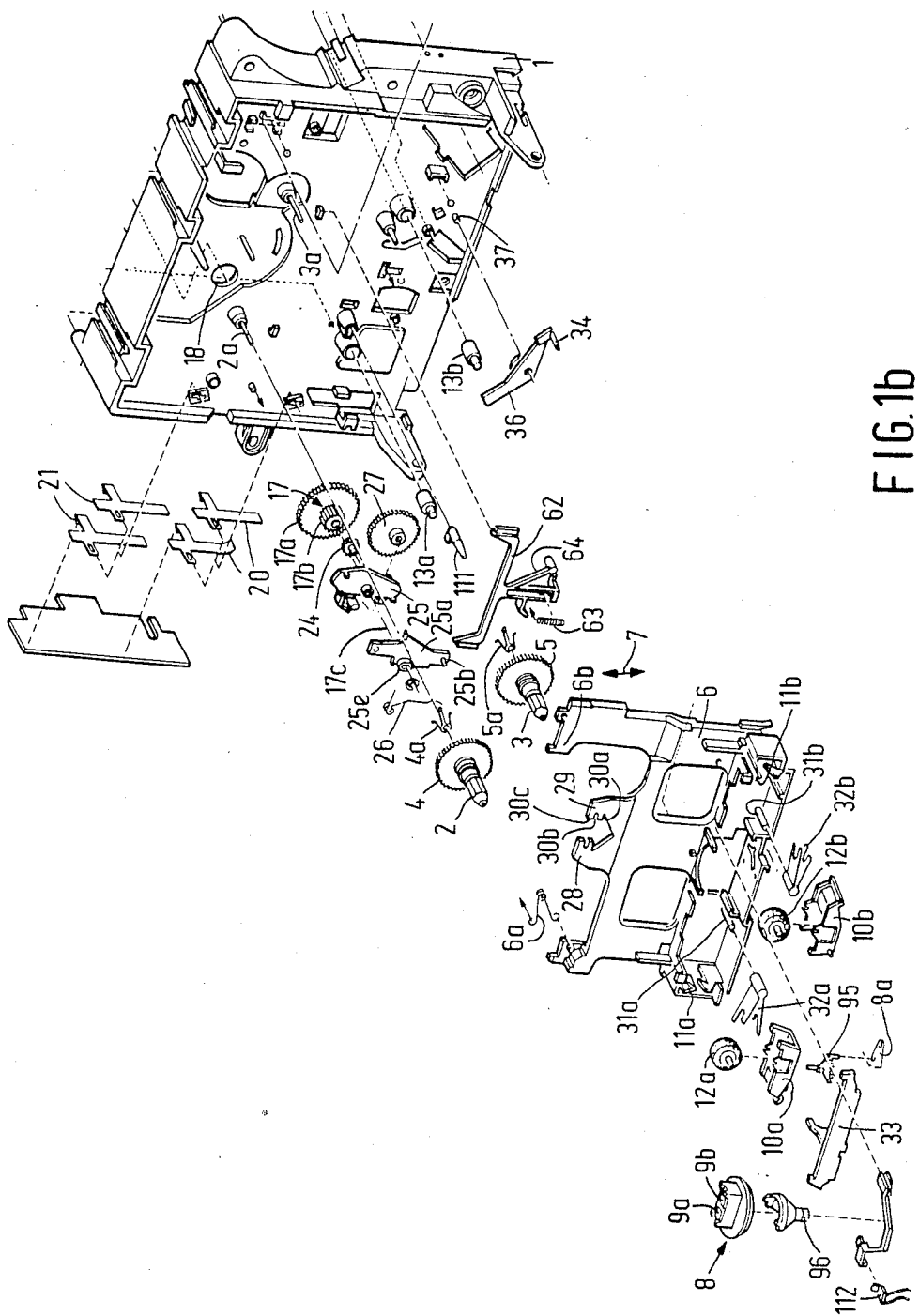

The magnetic tape apparatus shown in FIGS. 1a and 1b comprises a frame 1 to which at the underside a deck plate 1a is secured by means of screws. The frame 1 carries two adjacent journals 2a and 3a on which the winding spindles 2 and 3 respectively are mounted for rotation. The lower end portions of the winding spindles each carry a coaxial circumferentially toothed winding wheel 4 and 5 respectively. A friction spring 4a and 5a respectively acts against the underside of each winding wheel. The function of the friction spring is, if for example the wheel 5 is driven, to provide some counterfriction for the winding spindle 2, so that during winding the magnetic tape is kept sufficiently taut at the side of this spindle 2.

A head-mounting plate 6 is guided on the frame 1 for rectilinear movement in directions indicated by the double arrow 7. In a manner to be described hereinafter, the head-mounting plate 6 can occupy a retracted position relative to the winding spindles and a magnetic tape cassette, not shown, on these spindles, and from this position the head-mounting plate can be moved to a first or a second advanced position, the distance of the head-mounting plate from the winding spindles 2 and 3 being smaller in the first advanced position than in the second advanced position. The head-mounting plate 6 carries a rotatably mounted head system 8 comprising a combined recording/playback head 9a and an erase head 9b. Further, the head-mounting plate 6 carries two pressure-roller levers 10a, 10b which are mounted so as to be pivotable about V-shaped knife-edge fulcrums 11a, 11b secured to the upper side of the head-mounting plate 6. At the end portions which are remote from the knife-edge fulcrums 11a, 11b the pressure-roller levers 10a, 10b carry a pressure roller 12a and 12b respectively.

The head-mounting plate 6 further carries two pins 31a and 31b. A first arm of each of a two-armed pressure spring 32a and 32b respectively, is urged against each pressure-roller lever. These springs are constructed as blade springs and are secured to the pins 31a, 31b, respectively. The other arm of the pressure spring 32a or 32b acts against an upright wall of the head-mounting plate in the rest position of this plate. The head-mounting plate 6 carries a slide 33 against which a pin 92a or 92b on the underside of the pressure-roller lever is urged by the pressure spring 32a, 32b. The slide 33, in a manner to be described hereinafter, controls the pivotal movement of the pressure-roller lever 10a or 10b about the fulcrums 11a and 11b respectively by a sliding movement in a direction perpendicular to that indicated by the arrow 7 (see FIG. 7). Thus, in the first advanced position of the head-mounting plate 6 the pressure roller 12a or the pressure roller 12b is urged against a capstan 13a or 13b respectively depending on the position of the slide 33. In the second, less advanced position of the head-mounting plate the two pressure rollers 12a, b are clear of the capstan 13a, b. Each capstan 13a, b is journalled in the frame 1 and underneath this frame it is rigidly connected to a flywheel 14a, 14b which is journalled in the deck plate 1a. A belt 15 around a pulley 16a of a first drive motor 16 is also passed around the circumference of the flywheels 14a, 14b. In this way, as is shown in FIG. 1, the flywheels are driven in opposite directions by the motor 16 through the belt 15, so that the capstans 13a and b also rotate in opposite directions.

Figure 2:
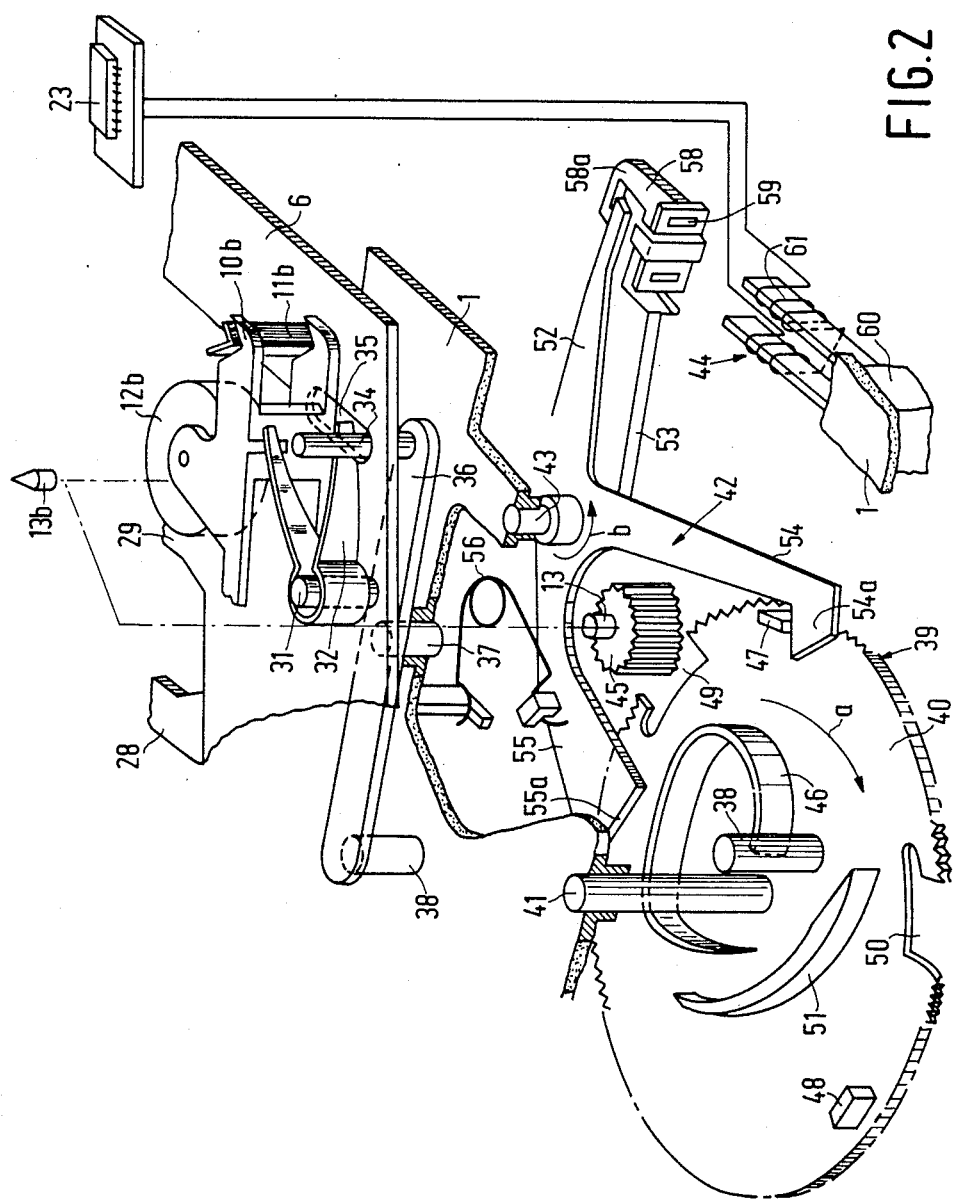
FIG. 2 is an enlarged-scale exploded view of the head-mounting plate and the associated servo device of the magnetic tape apparatus shown in FIG. 1.
Figure 11:
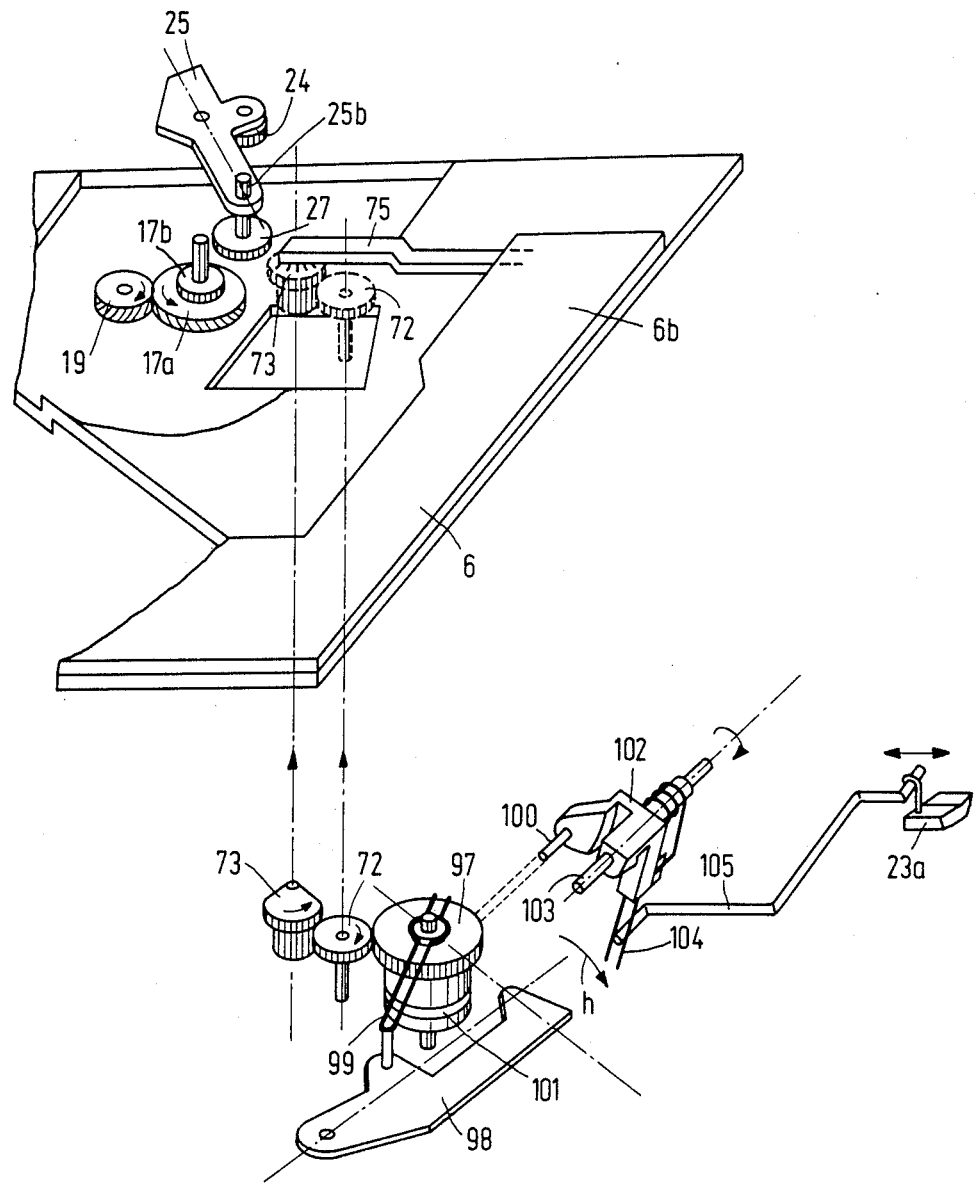
FIG. 11 is an exploded view of parts of the apparatus during actuation of the second switching device.

Above the frame 1 in the space between the winding wheels 4 and 5 a toothed drive wheel 17 is arranged, which gear comprises a comparatively large wheel 17a and comparatively small gear 17b. Further, a comparatively small gear wheel 19, which is rigidly connected to the shaft of the second drive motor 22, extends through an opening 18 in the frame 1. This motor is the winding motor of the magnetic-tape apparatus. The motors 22 and 16 are electrically connected to a microprocessor circuit 23 in a manner not shown (see FIG. 2) by means of which circuit the two motors can be switched on and off and the direction of rotation of the motor 22 can be reversed. Further, the microprocessor circuit 23 can switch the motor 22 to operate at a first operating voltage or a second operating voltage level, the motor producing a comparatively large driving torque at the first higher voltage and a comparatively small driving torque at a second lower voltage. The microprocessor circuit is also electrically connected to an impulse relay 44 through an electrical switch 20, which detects the position of the head-mounting plate 6 by means of a cam 6c (see FIG. 7); to a switch 21, which detects the position of the head system 8 and the pressure rollers 12a, 12b (see FIG. 7); and to a switch 23a (see FIG. 11), which can set the apparatus to the recording mode and which, in a manner to be described hereinafter, is actuated after actuation of a "record" button, not shown.

A pivotal arm 25 (see FIGS. 11 and 12a–c) is pivotable about the axis 17c of the drive wheel 17. The arm 25 has a free end portion which is remote from the axis and carries bearing means for a comparatively large toothed idler wheel 27. The pivotal arm 25 further comprises a lateral projection 25c which carries a comparatively small gear wheel 24 (see also FIG. 12). The idler wheel 27 and the gear wheel 24 both mesh with the comparatively small gear wheel 17b. In a manner to be described hereinafter the idler wheel 27 can mesh with the winding wheel 4 or the winding wheel 5 after the pivotal movement of the pivotal arm 25 and thereby enable the drive motor 22 to drive the winding spindle 2 or the winding spindle 3.

In a manner, not shown, the pivotal arm 25 is connected to a friction spring 26 having a free end which presses against the idler wheel 27, which spring, at the instant at which direction the direction of rotation of the drive motor 22 is reversed, controls the pivotal movement of the arm 25 about the axis 17c as a result of the friction torque exerted on the idler wheel 27. Thus, by pivoting the pivotal arm the idler wheel 27 can be coupled to the winding wheel 4 or 5. When the winding spindle 2 or 3 is driven winding is possible at a comparatively low speed during recording and playback and at a comparatively high speed during fast winding. This is achieved by switching the motor 22 to operate at the second lower or the first, higher voltage to produce a comparatively low or a comparatively high motor torque respectively. Further, as is shown in FIGS. 1b and 12a–c, the pivotal arm 25 carries an elongate sliding element 25a which is radially slidable relative to the spindle 17c between a first nonshifted position and a second shifted position, for which purpose this element is guided on the arm 25. To this end the sliding element 25a is formed with a slot 25e through which the axis 17c extends and at a first free end it comprises a bifurcate portion 25f whose limbs extend on opposite sides of a guide projection 25g on the pivotal arm 25. Consequently, the sliding element 25a follows the pivotal movements of the pivotal arm 25. At the free end which is remote from the portion 25f the sliding element 25a carries a stop projection 25b which is disposed substantially coaxially with the idler wheel 27 if the sliding element 25a is in its first position. The sliding element 25a can be slid from the first position to the second position against the action of a pressure spring 25d, which happens in the second slightly advanced position of the head mounting plate 6. The pressure spring 25d is situated between the central portion of the bifurcate portion 25f and the guide projection 25g on the pivotal arm 25.

Figure 12A:
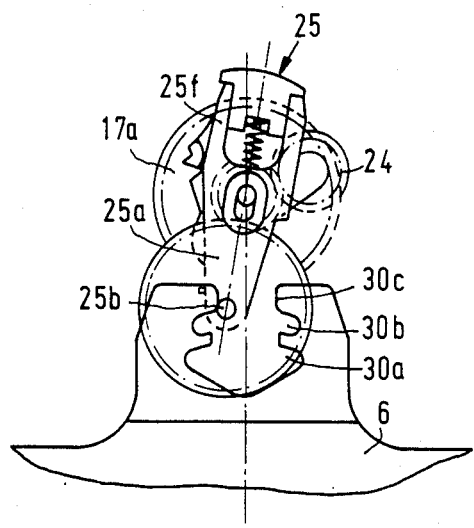
FIGS. 12a, 12b and 12c are plan views showing a part of the apparatus in three different positions of the head-mounting plate.

Two mutually parallel limbs 28 and 29 project from the head-mounting plate 6 and are constructed and arranged mirror symmetrically relative to a plane perpendicular to the deck 1 and parallel to the arrow 7. Therefore, the description of the limb 29 also applies to the limb 28. The limb 29 extends from the head-mounting plate 6 towards the free end and in a raised edge portion it has a first recess 30a and a second recess 30b. These recesses open into the pivoting space for the stop projection 25b between the limbs 28 and 29. If the motor 22 is started before the head-mounting plate 6 is moved towards the winding spindles 2 and 3, the arm 25 is pivoted and the stop projection 25b moves laterally in the space between the limbs 28 and 29 and is consequently pressed against a stop edge 30c. As is shown in FIG. 12a, the idler wheel 27 cannot mesh with the winding wheel 4 or 5 in the position where the stop projection 26 abuts the edge 30c. Thus, the two stop edges 30c constitute first positioning means of the head-mounting plate which position the idler wheel 27 into an inoperative position. In a manner to be described hereinafter, the drive motor 22 can then perform two further functions.

Figure 12B:
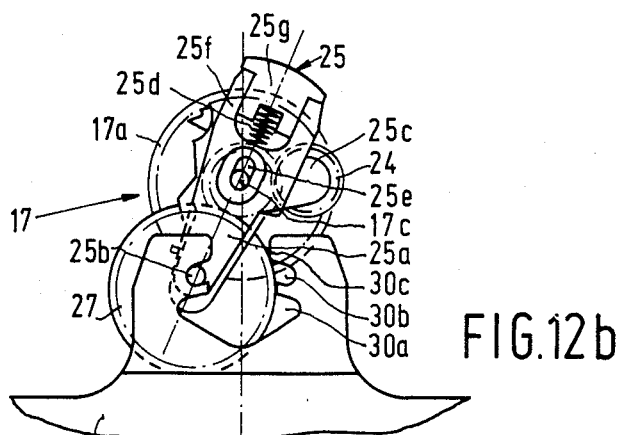
Figure 12C:
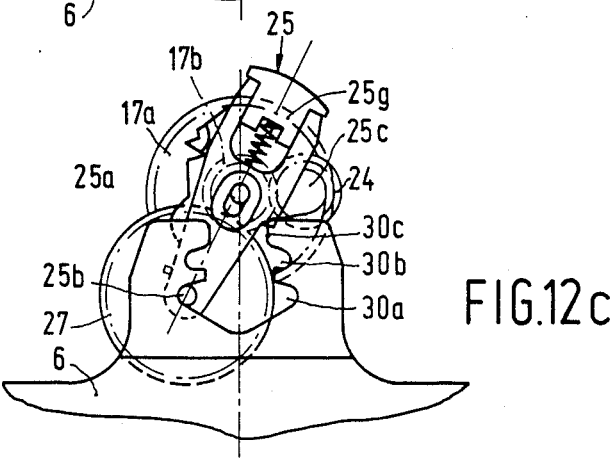

If the head-mounting plate is advanced in a manner to be described hereinafter, after the motor 22 has been switched to operate at a low voltage, the stop projection 25b will enter the second recess 30b from the pivoting space and the sliding element 25a will be moved to the second position by the advancing head-mounting plate 6, so that the stop projection 25b occupies a stop position and the head-mounting plate 6 is moved into the second advanced position (see FIG. 12b). In this position the idler wheel 27 can mesh with the winding wheel 4 or 5 after which fast winding is possible because the motor voltage applied to the motor 22 is increased.

However, if the head-mounting plate 6 is advanced before the motor 22 is started, the stop projection 25b does not obstruct the movement of the head-mounting plate and this plate can be moved to the first, fully advanced position. A spring 6a then ensures that the head-mounting plate is positioned correctly in the first position and abuts against a stop, not shown, on the deck plate, thereby causing one of the pressure rollers 12a, 12b to be urged against the associated capstan 13a, 13b. After starting of the motor 22 the stop projection 25b now moves from the pivoting space into the first recess 30a and the idler wheel 27 can mesh with the winding wheel 4 or 5 to drive the respective winding spindle. As already stated, the motor 22 is now operated at a lower voltage which is high enough to obtain tape transport.

This construction provides a performance advantage, in that after the stop projection 25b has engaged the recess 30b and the idler wheel 27 has meshed with the winding wheel 4 or 5 the head-mounting plate is moved slightly further as the element 25a is slid. As a result of this motion, the second position of the head-mounting plate 6 can be situated comparatively close to the first position. This enables the total travel of the head-mounting plate 6 between the retracted position and the first position to be limited and, consequently, the dimensions of the apparatus to be minimized. Another advantage is that, in view of the small distance over which the head-mounting plate 6 is retracted compared to the normal transport position, the magnetic head 9a can also be used for a "search system" in the second position to scan the tape during fast winding. These advantages are obtained without the mechanical strength of the stop projection 25b and parts of the head-mounting plate 6 being reduced.

In a manner as shown in FIG. 2a pin 34, which extends through a slot 35 in the head-mounting plate 6, presses against one of the limbs of the pressure spring 32b. The pin 34 is mounted at the free end of one arm of a two-armed actuating lever 36 which is pivotable about a pivot 37 connected to the frame 1. At the free end of the other arm the actuating lever 36 carries a pin 38 which extends through the frame 1 up to a servo device 39 which is situated underneath this deck plate and which will be described in more detail hereinafter.

Figure 3:
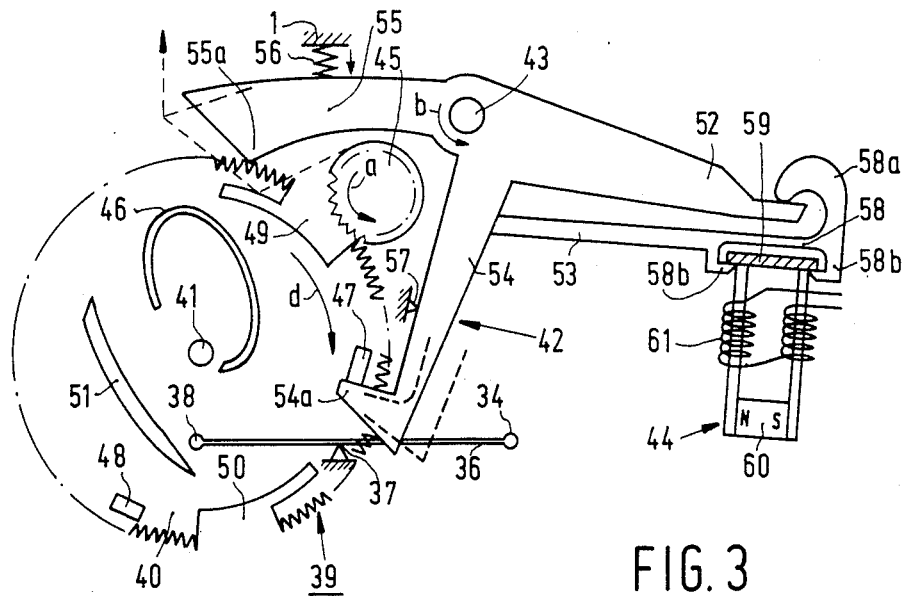
FIG. 3 is a schematic plan view showing the servo device of FIG. 2 in a first rest position.
Figure 5:
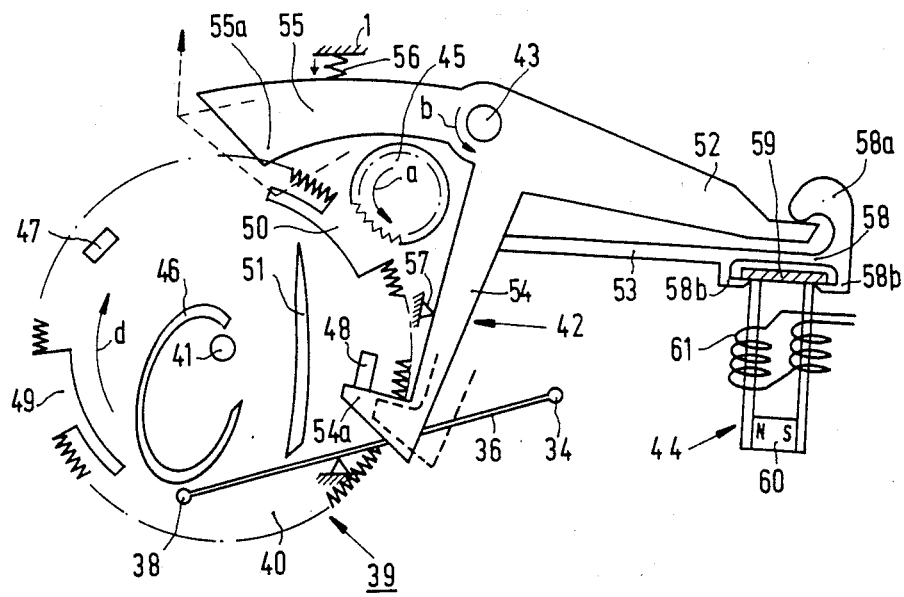
FIG. 5 is a schematic plan view showing the servo device of FIG. 2 in a second rest position.

The servo device 39 comprises a toothed servo wheel 40 which is journalled in the frame 1 by means of a spindle 41. Further the servo device 39 comprises a servo member 42 which is pivotable about a spindle 43 mounted on the underside of the frame 1. The servo member 42 is adapted to cooperate with the impulse relay 44, which is also secured to the underside of the frame 1. The servo wheel can be driven by a gear wheel 45, which is rigidly mounted on the spindle of the flywheel 14b and which can thus be driven by the first motor 16, which causes the gear wheel to rotate in the direction indicated by the arrow a in FIG. 3. As is shown in FIG. 3 the servo wheel carries a cam 46 which is disposed eccentrically around the spindle 41 and two latching projections 47 and 48 which are spaced from each other. The servo wheel 40 is provided with circumferential teeth and has two recesses 49 and 50 in its periphery where the wheel is not toothed. In this way the servo wheel 40 can occupy a first rest position (see FIG. 5) in which the recess 49 or 50 is situated opposite the gear wheel 45 with the result that the gear wheel cannot drive the servowheel. The servo wheel 40 further carries a ridge 51 which is also disposed eccentrically relative to the spindle 41. The servo member 42 comprises four arms, namely a rigid arm 52, a flexible arm 53, a stop arm 54 and a reset arm 55. The reset arm 55 is loaded by a spring 56 which acts between the arm 55 and the frame 1 and which constantly tends to pivot the relay-armature member 42 about the spindle 43 in the direction indicated by the arrow b. The reset arm 55 comprises a reset projection 55a, which is situated at the free end of the arm 55 near the circumference of the servo wheel 40 and which comprises two converging walls forming an angle with each other. At its free end the stop arm 54 carries a stop projection 54a which is constructed as a hook and which comprises a stop wall which is disposed substantially tangentially relative to an imaginary circle concentric with the spindle 43 for abutment with the latching projection 47 or 48. In the rest positions shown in FIGS. 3 and 5 the latching projections 47 and 48 respectively abut the stop projection 54a, so that the servo wheel 40 is latched in the respective rest position. In this position the stop arm 54 abuts a stop 57 on the frame 1, which stop defines the position of the relay-armature member 42 in the latching position. At its free end the flexible arm 53 comprises a rigid support 58, which comprises a coupling element 58a which is hook-shaped and, viewed in a direction parallel to the spindle 43, extends from the support 58 around the free end of the rigid arm 52 and, in the coupled position shown in FIG. 3, engages that side of the rigid arm 52 which is remote from the support 58. Further the support 58 comprises retaining portions 58b, which serve to retain a plate for a soft-iron element 59. In the latching position of the servo member 42 as shown in FIGS. 3 and 5, the soft-iron element is drawn against the impulse relay 44.

The impulse relay 44 comprises a permanent magnet 60 comprising two limbs around which two coils 61 are wound. Consequently, the relay 44 comprises both a permanent magnet and an electromagnet, whose coils are connected to a current source, not shown, under control of the microprocessor circuit 23. The impulse relay 44 is arranged so that when the coils 61 are not connected to the current source the magnet 60 consequently attracts the soft-iron element 59 as a result of its permanent magnetism. In the latching position the relay-armature member 42 is kept firmly in position by means of the stop 57 and the impulse relay 44. A brief energization of the coils 61, which can be achieved by means of an electrical impulse, causes the permanent magnetism of the magnet 60 to be neutralized by the electromagnet, so that the soft-iron element 59 is no longer attracted. The spring 56 then causes the relay-armature member 42 to pivot about the spindle 43 in the direction indicated by the arrow b. By means of the coupling element 58a, when the relay member is pivoted in the direction indicated by the arrow b, the support 58 can be pivoted with the soft-iron element 59 rigidly coupled to the arm 52 and, when the relay-armature member is pivoted in a direction opposite to that indicated by the arrow b, the rigid arm 52 can be pivoted slightly further after the soft-iron element 59 has been attracted by the magnet 60. This is possible due to the elastic flexibility of the arm 53.

Figure 4:
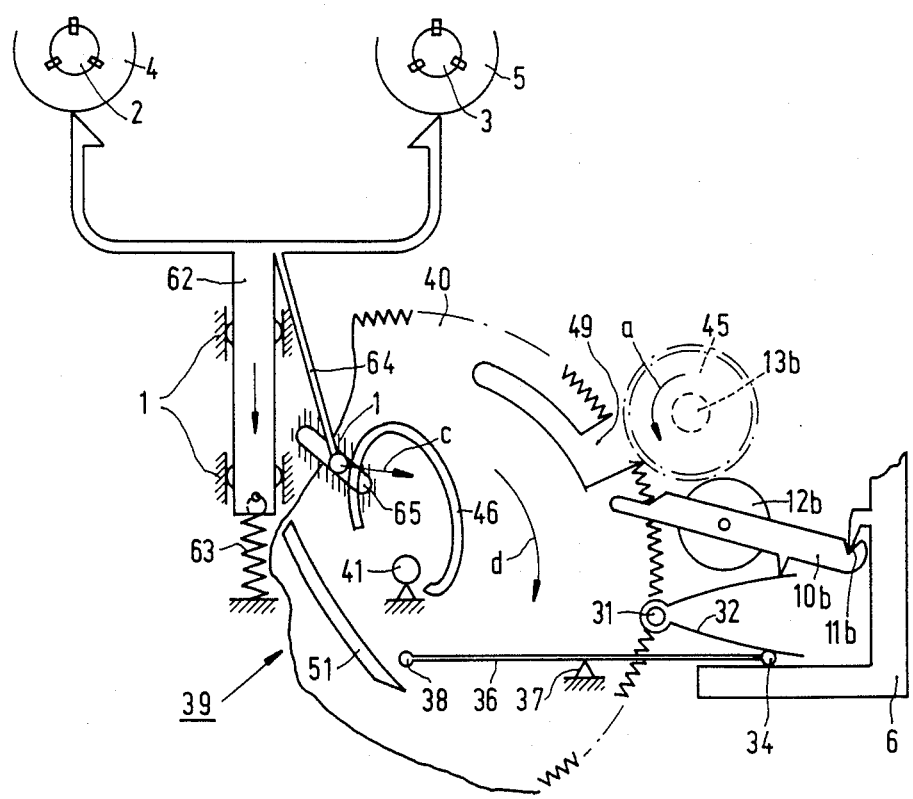
FIG. 4 is a schematic plan view showing the servo device in the first rest position of FIG. 3, together with a part of the head-mounting plate and a brake member.
Figure 6:
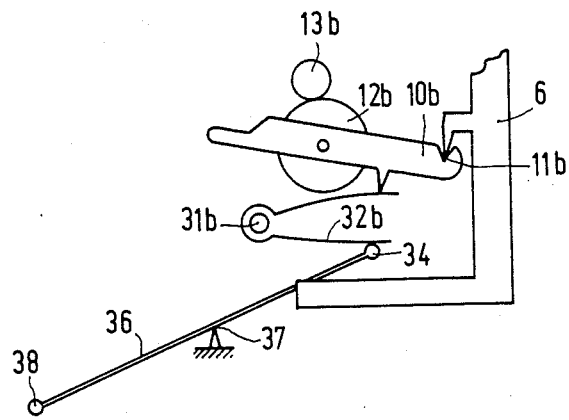
FIG. 6 is a schematic plan view showing a part of the head-mounting plate, which is in an advanced first position, and the actuating member which cooperates with this plate.

As is shown in FIGS. 1 and 4 a brake member 62 is guided in the frame 1 so as to be slidable parallel to said plane of symmetry at half the distance from the winding idlers 4 and 5, a spring 63 consequently urging the brake member 62 in a direction away from the winding idlers 4 and 5. The brake member 62 carries a projecting element 64 which is guided in a slot 65 in the frame 1. In the first rest position of the servo wheel 40 the free end of the element 64 presses against the cam 46 under the influence of the spring 63 and exerts a starting torque (arrow c) which tends to rotate the wheel 40 about the spindle 41 in the direction indicated by the arrow d. However, as long as the stop projection 54a is in engagement with the latching projection 47, this starting torque c can have no effect. However, if as a result of the pulse-wise energization of the impulse relay 44 the soft-iron element 59 is no longer attracted the relay-armature member 42 can pivot about the spindle 43 in the direction indicated by the arrow b. In this respect it is advantageous that the relay-armature member 42 is rigid except for the flexible arm 53, so that the friction between the stop projection 54a and the latching projection 47 can be compensated for effectively. After the release of the servo wheel 40 the starting torque (arrow c) can rotate the servo wheel to bring the circumferential teeth of the servo wheel into mesh with the gear wheel 45, which is driven by the motor 16, so that the servo wheel is rotated further in the direction indicated by the arrow d as a result of the rotation of the gear wheel 45 in the direction indicated by the arrow a. At the instant at which the impulse relay 44 is energized the second motor 22 has not yet started if the first advanced position is to be occupied. If the head-mounting plate 6 is to be moved to the less advanced second position the second motor 22 should be started before the impulse relay 44 is electrically energized. During rotation of the servo wheel 40 the actuating lever 36 is moved into the position shown in FIGS. 5 and 6 by the cam 46. The lever can assume this position because the latching projection 48, as is also shown in FIG. 5, has first engaged the reset projection 55a and thereby pivotally reset the relay-armature member 42 from the inoperative position to the latching position. Subsequently, after the final part of the rotation of the latching projection 48, this projection abuts the stop projection 54a on the relay-armature member 42, so that the servo wheel 40 is now latched in the second rest position. In this position the recess 50 is disposed opposite the gear wheel 45, so that a further rotation of the gear wheel 45 has no effect on the servo wheel 40.

During the pivotal movement of the actuating lever 36 by the cam 46, pressure is exerted on the spring 32b by the pin 34, so that the spring presses against the pressure-roller lever 10b. As a result of the knife-edge fulcrum 11b and the abutment of the pin 52b on the pressure-roller lever 10b against the slide 33, the head-mounting plate 6 is advanced to the first or the second advanced position, the switch 20 being closed by the projection 6c on the head-mounting plate 6 in both positions. In the first advanced position the pressure roller 12a or 12b now presses against the capstan 13a or 13b with the result that the pin 34 moves slightly further than the head-mounting plate 6, so that there is sufficient pressure on the capstan 13a or 13b through the pre-load on the spring 32b and the force of the spring 6a. This has the advantage of compensating effectively for possible tolerances in the transmission between the cam 46 and the head-mounting plate 6. From the instant at which the pressure roller 12a or 12b presses against the capstan 13a, 13b, which is detected by the switch 20, the circuit 23 signals that the motor 22 can be switched to the lower voltage and that recording or playback may commence and the tape may be wound towards the winding spindle 2 or 3 in a manner to be described hereinafter.

For detecting the end of the tape a plate 110 is secured underneath the frame 1 and carries a photocell, not shown, which is arranged near the lower end portion of a light guide 111 (see FIG. 1a). The head-mounting plate 6 carries a light source 112 which emits light towards the upper end of the guide 111. As soon as the non-transparent magnetic tape has been transported up to its end the light is transmitted by the transparent leader tape which connects the magnetic tape to the reel of the magnetic-tape cassette, not shown, and the end of the magnetic tape is detected by the photocell. This cell now supplies an electric signal to the microprocessor circuit 23.

When the end of the magnetic tape is reached or if a stop button or a direction-reversal button ("direction" button), not shown, is actuated the impulse relay 44 is re-energized by the circuit 23. As a result of this, the relay-armature member 42 is again moved from the latching position to the inoperative position, while in addition the latching projection 48 is disengaged from the stop projection 54a. In this situation the actuating lever 36 has been pressing against the cam 46 in such a way that the pressure exerted on the actuating lever 36 by the spring 32b produces a starting torque on the cam, so that the servowheel 40 can rotate further in the direction indicated by the arrow d as soon as the latching projection 48 is released. Then the circumferential teeth on the servo wheel can again mesh with the gear wheel 45. As a result of this, the servo wheel is again driven, the pin 38 being guided between the cam 46 and the ridge 41, so that the actuating lever 36 is pivoted back in a clockwise direction about the spindle 37. This results in the pin 34 pressing directly against the end wall of the slot 35 in the head-mounting plate 6 so that this plate is moved towards the retracted position in the direction indicated by the arrow 7.

When the servo wheel 40 begins to rotate, the cam 46 exerts a force on the projecting element 64 of the brake member 62 such that the brake member is briefly moved towards the winding idlers 5 and 4. Consequently, during the rotation of the servo wheel 40 the brake member is actuated and the winding idlers 4 and 5 are braked. During the rotation in the direction indicated by the arrow d, the latching projection 47 cooperates with the reset projection 55a to return the relay-armature member from the inoperative position to the latching position (see FIG. 3). Subsequently, the latching projection 47 again abuts the stop projection 54a so that the servo wheel again occupies the first rest position as shown in FIG. 3. If the stop button is pressed the head-mounting plate 6 remains in the retracted position and the motors 16 and 22 are stopped. However, if the end of the tape is detected by the photocell or the direction-reversal button is actuated the head-mounting plate 6 is directly moved from the retracted position to the first position by the servo wheel 40 and tape transport is effected in the reverse direction in a manner to be described hereinafter.

For the reversal of the direction of tape transport a servo member 70 is mounted for pivotal movement underneath the frame 1 in a manner as shown in FIGS. 1, 7, 8 and 9, which servo member is constructed as a two-armed lever which is pivotable against the force of a latching spring 71. At the free end of a first arm 70a the servo member carries two rotatable gear wheels comprising a coupling wheel 72 and a switching wheel 73 which is in mesh therewith. The switching wheel is urged upwards in an axial direction relative to the servo member 70 by a spring 74. The upward movement of the switching wheel is limited by a projection 75 which is pivotally connected to the frame 1 and which cooperates with an abutment edge, not shown, formed on the lower surface of a projecting limb 6b of the head-mounting plate 6. Thus, by moving the head-mounting plate 6 to the first or the second advanced position the switching wheel 73 can be pressed axially downwards as a result of a downward pivotal movement of the projections 75, so that the switching wheel 73 becomes disengaged from the gear wheel 74 on the pivotal arm 25. In this way the head-mounting plate 6 moves the switching wheel 73 to an inoperative position by means of the abutment edge and by means of the projection 75, which together constitute the second positioning means of the head-mounting plate. Further it is to be noted that, for the sake of clarity, the sliding element 25a shown in FIGS. 1 and 12 is omitted in FIGS. 7 and 11. These Figures show the stop projection 25b on the pivotal arm 25 but in reality the stop projection 25b is situated on the sliding element 25a, as is shown in FIGS. 1 and 12.

In the retracted position of the head-mounting plate 6 it is ensured that the switching wheel 73 is in mesh with the gear wheel 24 through the second positioning means. In this way the drive motor 22 can drive the coupling wheel 72 through the switching wheel 73. The servo member 70 first arm 70a extends almost up to the rear of the apparatus, where the arm 70a carries the coupling wheel 72 and the switching wheel 73. Substantially halfway between the rear wall and front wall of the apparatus the servo member 70 is mounted so as to be pivotable about a pivotal axis 70c and at this location the first arm 70a adjoins the second arm 70b. The latter arm extends almost up to the front of the apparatus and at this location it has a bent portion bearing the reference numeral 70d in FIGS. 7, 8 and 9. At the free end of the bent portion 70d two latching projections 76a and 76b are provided, which in the same way as described for the latching projection 54a can block a toothed second servo wheel 77 against rotation. For this purpose, the servo wheel 77 carries two latching projections 78 and 79 whose function may be compared to that of the latching projections 47 and 48 of the servo wheel 40. The two projections 76a and 76b are radially spaced from each other relative to the axis of rotation of the wheel 77. This is in order to preclude that, as a result of the time required for the servo member 70 to return to the latching position after actuation so that the projection 76a does not resume the latching position at the correct instant, the servo wheel would continue to rotate. This construction ensures that after 180° rotation of the wheel 77 the projection 76b, which is situated at a shorter distance from the axis of rotation of the wheel 77, initially retains the latching projections 78 or 79 and subsequently, during the return movement of the servo member 70, guides the latching projection to the stop projection 76a in a manner, not shown, to keep the wheel again in the latching position.

Figure 7:
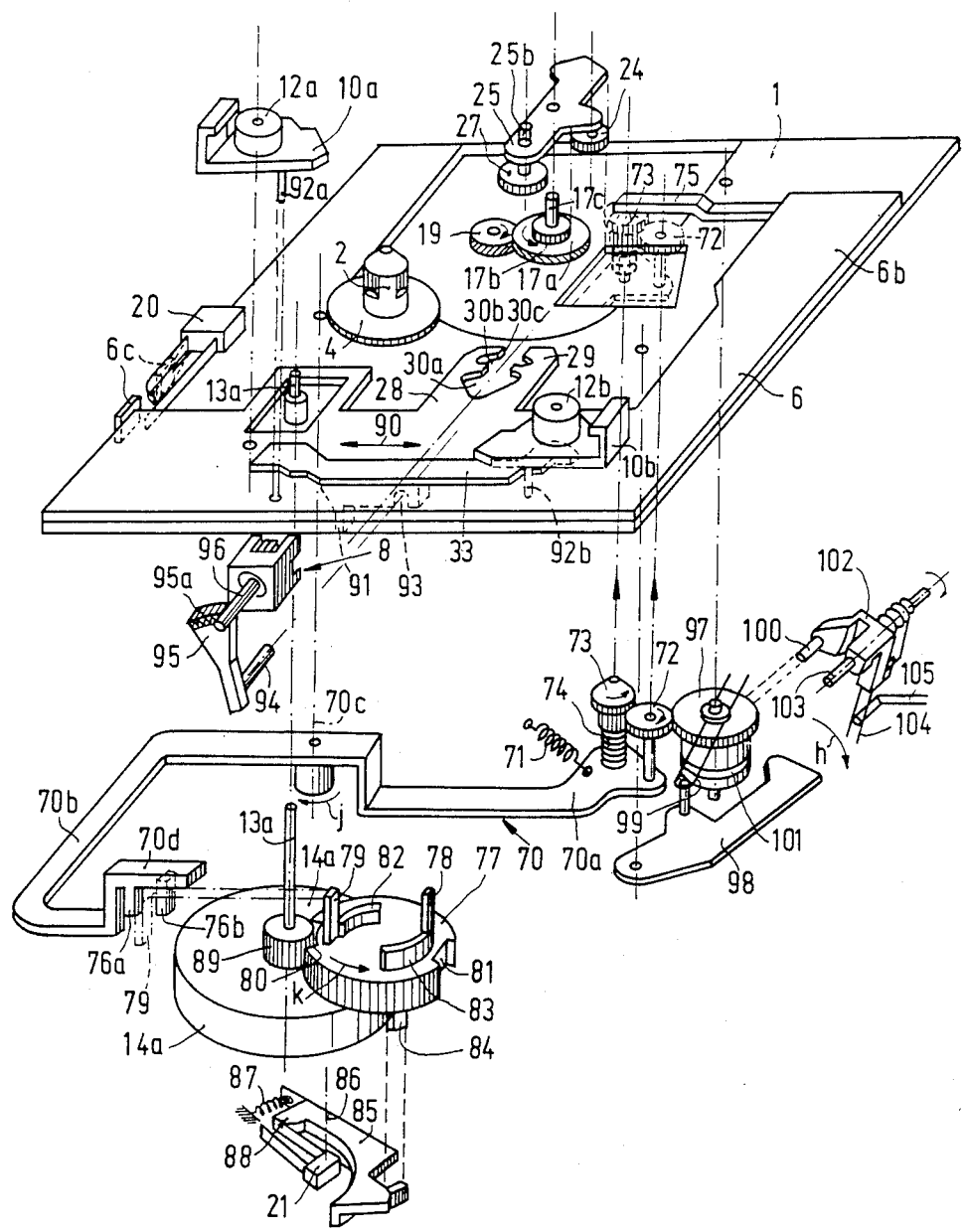
FIG. 7 is an exploded view to a different scale, showing a part of the apparatus which is relevant to the present invention and which comprises the first and the second switching device.
Figure 9:
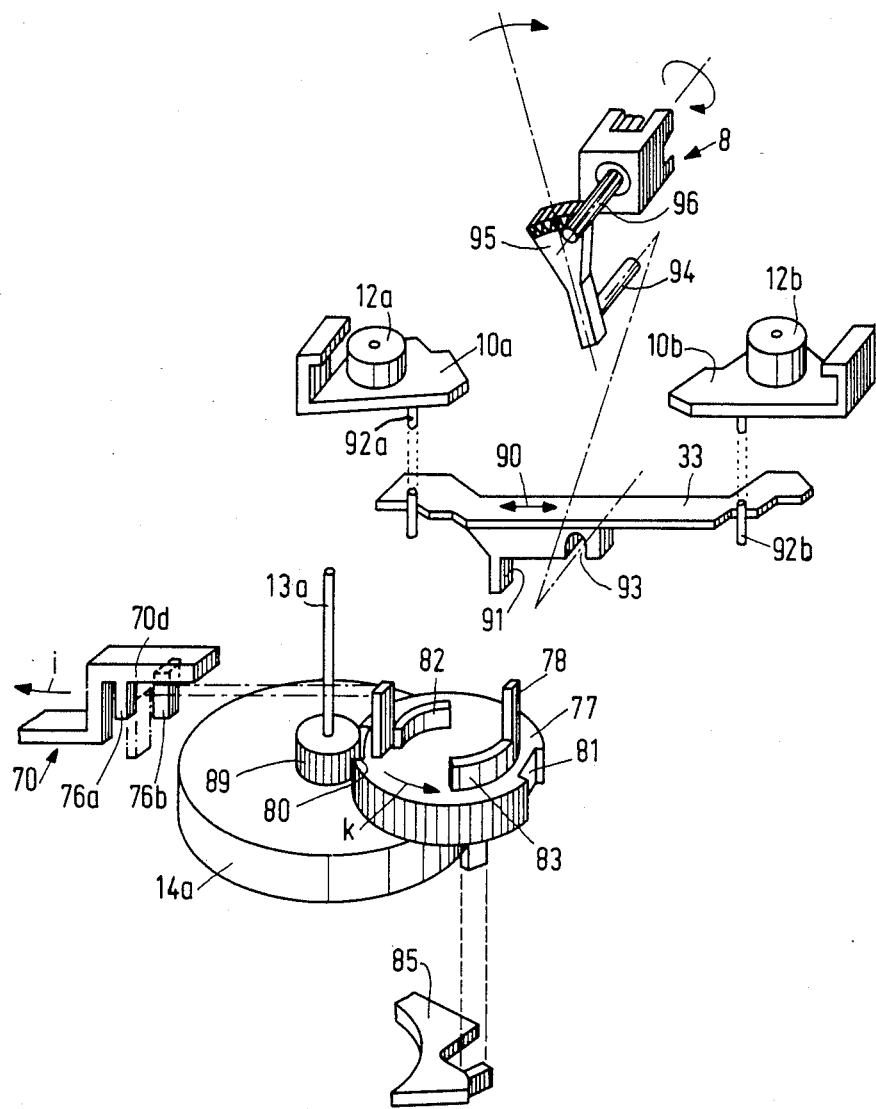
FIG. 9 is an exploded view of a part of the first switching device during switching of the first apparatus function.

Near each latching projection the servo wheel 77 has a non-toothed portion 80 and 81 respectively. These non-toothed portions are similar to the portions 49 and 50 of the servo wheel 40. There are also provided two cams 82 and 83 similar to the cam 46 and the ridge 51. Further, the lower side of the servo wheel 77 also carries two starting pins 84, of which one pin is shown in FIG. 7. These starting pins are adapted to cooperate with a starting member 85 which is pivotable about an axis 86, the starting member 85 being attached to a spring 87 which tends to pivot the member about the axis 86 and which thus produces the starting torque for the servo wheel 77. Moreover, the starting member 85 comprises a projection 88 which cooperates with the contacts of the switch 21. The servo wheel 77 can cooperate with a gear wheel 89, which is rigidly connected to the flywheel 14a. As the pins 84 are disposed at different radial distances from the axis of rotation of the wheel 77 the starting member 85, in each of the two rest positions of the wheel 77, occupies a position corresponding to these rest positions, which is detected by the switch 21. Thus switch 21 can supply a signal indicative of the position of the wheel 77 to the microprocessor circuit 23.

The underside of the slide 33, which is guided on the head-mounting plate 6 for rectilinear movement in directions indicated by the double arrow 90, carries a limb 91 which extends to a location underneath the frame 1. As a result of this, the limb 91 can be controlled by the cams 82 and 83. During contact with the cam 82 this cam presses the limb 91 to the left, as indicated by the double arrow 90 in FIG. 7, the limb 91 abutting the outer surface of the cam 82. During the cooperation with the cam 83 the limb 91 abuts the inner side of the cam 83, so that the limb 91 is moved to the right viewed in FIGS. 7 and 8.

Further, the coupling wheel 72 engages a body which, as will be explained hereinafter, can at least temporarily assume a stationary position. This body comprises a third toothed servo wheel 97 which is rotatably journalled in the frame 1. The servo wheel 97 is blocked against rotation in one direction by a latching member 98 which is constituted by a pivotable lever, which ensures that the servo wheel 97 occupies a fixed position if the coupling wheel rotates in a direction as indicated by the arrow f in FIG. 8. If the coupling wheel rotates in a direction opposite to that indicated by the arrow f because the drive motor 22, which is operated at the higher voltage, drives the coupling wheel in the other direction, the servo wheel 97 will rotate in the direction indicated by the arrow g in FIG. 10, so that as a result of the friction coupling, which bears the reference numeral 99 in FIG. 11, between the servo wheel and the latching member 98 the latching member 98 is pivoted into an inoperative position in the direction indicated by the arrow h. Thus, depending on the direction of rotation of the motor 22 and depending on the voltage level, the servo wheel 97 occupies a fixed position or can rotate. If the servo wheel is in a fixed position the situation shown in FIG. 8 is obtained, in which the coupling wheel 92 exerts a force W on the servo member 70, which if the motor 22 is operated at the higher voltage is large enough to overcome the force V exerted by the latching spring 71, thereby causing the servo member 70 to be pivoted about the pivotal axis 70c in the direction indicated by the arrow j in FIG. 8. This can be achieved by an impulse-wise energization of the motor 22. In this position the latching projections 76a and 76b consequently move over the same distance in the direction indicated by the arrow j in FIG. 9 to release the latching projection 78 or 79, so that the servo wheel 77 is no longer locked. As a result of this, the starting member 85 can exert a starting torque on the servo wheel 77, so that the teeth of this wheel mesh with the teeth of the wheel 89 and the servo wheel begins to rotate in the direction indicated by the arrow k in FIG. 9. This results in the slide 33 being moved in the direction indicated by the arrow 19 via the cam 82 or 83. In the meantime the direction of rotation of the drive motor 22 has been reversed and the motor has been switched over to low-voltage operation by means of the microprocessor circuit 23. The motor 22 is again energized pulsewise but this suffices to reset the servo member 70 to the latching position by means of the latching spring 71, so that the servo wheel 77 stops after a rotation of 180° when the non-toothed portion 80 or 81 is disposed opposite the gear wheel 89.

Thus, if the head-mounting plate 6 is in the retracted position the servo wheel 77 can move the slide 35 to the left or to the right in a switching mode of the apparatus. This movement results in the pins 92a and 92b on the underside of the pressure roller 10a, b being actuated, so that depending on the position of the slide 32 the pressure roller lever 10a or the pressure roller lever 10b will occupy a more advanced position on the head-mounting plate. Thus, after the movement of the slide 33 and, after the subsequent movement of the head-mounting plate 6 to the advanced position, the pressure roller 12a or the pressure roller 12b can be pressed against the associated capstan 13a or 13b. This dictates the direction of tape transport in the recording or the playback mode of the apparatus.

Further, the underside of the slide 33 is formed with a recess 93 which receives a spindle 94 with some clearance. This spindle is rigidly connected to a pivotal arm 95, whose upper side is provided with teeth 95a. The teeth 95a engage with a toothed spindle 96, which is fixedly connected to the head system 8. An over-center spring 8a, shown in FIG. 1, ensures that in each end position of the pivotal arm 95 the head system 8 is positioned correctly on the head-mounting plate 6 against a stop, not shown. As a result of the clearance of the spindle 94 in the recess 93 the spindle 94 has enough room in the end position of the spindle 33 to enable the over-center spring 8a to urge the head system 8 firmly against the stop. As a result of the action of the pivotal arm 95 the head system 8 is thus also turned through 180° in opposite direction during the movement of the slide 33, so that depending on the direction of the tape transport the head system occupies the correct position for recording and/or playback. Since the positions of the pressure rollers 12a and 12b and the head system 8 are detected by the switch 21 via the slide 33, the servo wheel 77 and the starting member 85, the microprocessor circuit 23 can signal the position of the pressure-rollers and the head system by means of the switch 21. After the circuit 23 has ascertained that the pressure rollers and the head system have been moved to the correct positions, the head-mounting plate 6 is moved from the retracted position to the first position via the servo member 39. This movement is detected by means of the switch 20. These positions enable the magnetic-tape apparatus in accordance with the invention to operate as an "auto-reverse" apparatus.

If the drive motor 22 is operated at the higher voltage and the coupling wheel 72 is then rotated in a direction opposite to that indicated by the arrow f, this results in the servo wheel 97, as already described, being disengaged from the latching member 98, so that now the servo wheel 97 is rotated. As a result of this, a pin 100 is guided in a circumferential slot 101 formed in a sleeve which is coaxially secured to the servo wheel 97 and which is shaped like a sinewave. As a result of this shape the pin 100 moves with a switching member 102 about an axis 103, the switching member 102 cooperating with limbs of an over-centre spring 104. The limbs of the over-centre spring 104 are positioned against a rod 105, which is connected to the recording switch 23a (see FIG. 11). Thus, the rotation of the servo wheel 97 causes the recording switch 23a to be actuated, which results in an acknowledgement signal to the microprocessor circuit 23, which subsequently switches off the motor 22. At this instant the apparatus is in the "record standby" mode and the tape transport in the desired direction can be started by actuating the "play" or "replay" button on the apparatus.

In this way it is possible to actuate both the servo wheel 77 and the servo wheel 97 by means of the motor 22, so that in the switching mode of the apparatus two different apparatus functions can be actuated by means of the motor 22 with the aid of two switching devices. It is important that the force for actuating the servo wheel 97 can be produced only if the motor 22 is operated at the higher voltage. If the motor 22 is operated at the lower voltage it cannot overcome the resistance provided by the recording switch 23a, so that when operated at the lower voltage the motor 22 cannot influence the servo wheel 97. Thus, when operated at the lower voltage the motor 22 can only drive the idler wheel 27 and hence the winding idler 4 or 5.

Hereinafter a brief description is given of the switching operations effected for a specific apparatus function in the apparatus in accordance with the invention.

It is assumed that the apparatus is in the stop mode, in which all the parts are in their rest positions. Pressing any actuating button results in the drive motor 16 being started by the microprocessor circuit 23, so that the flywheels 14a, 14b begin to rotate in opposite directions. If the standby button is pressed, no further switching operation is effected; after approximately 2 minutes the motor 16 is stopped again by the microprocessor circuit 23.

If the "play" or "replay" button is depressed (which means tape transport from the winding spindle 2 to the winding spindle 3 or in the opposite direction at the low tape speed) the microprocessor circuit 23 will first check the positions of the pressure rollers 12a and 12b and the head system 8 via the switch 21. If this position corresponds to the direction associated with the relevant actuating button, the switching cycle described above is now effected, which commences with the actuation of the impulse relay 44. As a result of this, the head-mounting plate 6 is moved forward to the most advanced first position. However, if the switch 21 detects that the pressure rollers 12a and 12b and the head system 8 are not in the correct positions, the above switching cycle is effected by means of the motor 22 and the servo wheel 77 prior to the actuation of the impulse relay 44. When it is detected via the switch 21 that the slide 33 has been moved to the correct position, the head-mounting plate 6 is advanced in the manner described in the foregoing, which is detected by the switch 20. Subsequently, the motor 22 is re-energized with the lower voltage, causing it to rotate in the direction selected by pressing the relevant button "play" or "replay".

If one of the fast wind buttons "rewind" or "wind" is pressed the motor 22 is energized with the lower voltage after starting of the motor 16. The direction of rotation of the motor 22 depends on the selected actuating button. Subsequently, in the manner described in the foregoing, the head-mounting plate 6 is moved forwards by means of the actuation of the impulse relay 44, but now the head-mounting plate is blocked in the second less advanced position because the stop projection 25b now engages the recess 30b. After the closure of the switch 20 the motor 22 is switched to the higher voltage and fast tape transport in the desired direction is possible.

When the button "direction" is depressed, the motor 22 is energized with the higher voltage after starting of the motor 16. The motor 22 rotates in a direction corresponding to the direction associated with the actuating buttons "replay" and "rewind". This results in the switching cycle described above, which is effected by means of the motor 22 and the servo wheel 77. Subsequently, the motor 22 is switched off. Thus, the direction of tape transport of the magnetic-tape apparatus is reversed by pressing the "direction" button.

When the "record" button is actuated after starting of the motor 16, the motor 22 is driven in the direction corresponding to the actuation of the "play" or the "wind" button. Subsequently, the recording switch 23a is actuated via the servo wheel 97 to set the apparatus to "record standby".

It is important that the head-mounting plate can be set to three positions by means of only one impulse relay 44, the flywheel motor 16 and the winding motor 22. In the apparatus in accordance with the invention this can be achieved by means of a minimum number of electromechanical actuators.

The motor 22 can drive the winding spindle 2 or 3 for normal tape transport or for rapid tape transport in two opposite directions. Further, it is advantageous that the motor 22 can actuate two apparatus functions, namely the reversal of the direction of tape transport, by switching over the pressure rollers 12a and 12b and turning of the head system 8, and the changeover of the recording function, for which the recording switch 23a is actuated. The two last-mentioned apparatus functions are each started by briefly energizing the motor 22 with the higher voltage. Alternatively, this pulsewise energization of the motor 22 enables other apparatus functions to be switched by means of the motor 22. For example, instead of by means of the impulse relay 44 the head-mounting plate 6 can be switched by means of the motor 22. It is alternatively possible to switch only one apparatus function with the motor 22. This may be the reversal of the direction of tape transport or the changeover of the recording switch. The first possibility is obtained if the microprocessor circuit 23 starts the recording process fully electronically, while the second possibility is advantageous if the apparatus is constructed in such a way that it operates in only one direction of tape transport during recording and playback.

What is claimed is:

1. A magnetic tape apparatus comprising:
   at least one switching device for switching an apparatus function, comprising a servo wheel rotatable about an axis of rotation,
   two winding spindles having respective lower end portions, and a respective coaxial winding wheel connected to each spindle,
   a reversible drive motor, and means for coupling said motor to a respective winding wheel when the apparatus is in an operating condition, said means including an idler wheel arranged rotatably about an idler axis between said winding wheels, and means for moving said idler wheel between an inoperative position free of engagement with either winding wheel, and a selected one of two operating positions in engagement with one or the other winding wheel,
   a coupling wheel, and means, responsive to said apparatus being in a switching condition, for coupling said idler wheel to said coupling wheel to form a coupling between the drive motor and the switching device so as to activate said switching device to switch the apparatus function, characterized in that the apparatus further comprises a servo member movable between a first position and a second position, and means including a latching spring for urging said member into said first position by the force of said spring, in said first position said member locking said servo wheel in a latched position against rotation; and in the second position said member releasing said servo wheel to switch the apparatus function, means for switching the drive motor between first and second operating voltage levels, at the first level the motor producing a higher torque than at the second level, and an at least temporarily stationary body with which the coupling wheel is in contact, arranged such that, as the coupling wheel rotates in a first direction, the coupling wheel rolls along the body, and urges the servo member towards the second position, the force exerted on the servo member by the coupling wheel being only large enough to overcome the force on the latching spring when the motor is switched to the first level torque.

2. An apparatus as claimed in claim 1, characterized by comprising an axially movable switching wheel arranged in a transmission path from said drive motor to said coupling wheel, said coupling wheel and said switching wheel being carried on said servo member, said switching wheel being movable to an inoperative position for interrupting drive to the coupling wheel.

3. An apparatus as claimed in claim 2, characterized in that said servo member is a lever having first and second arms having respective free ends, arranged to be pivotable against the force of the latching spring; the coupling wheel and the switching wheel are disposed at the free end of the first arm; and the free end of the second arm includes means for keeping the servo wheel in said latched position.

4. An apparatus as claimed in claim 3, characterized in that said servo wheel includes a stop projection, and at its free end the second arm comprises two latching projections, radially spaced from each other relative to the axis of rotation of the servo wheel, for latching said stop projection.

5. An apparatus as claimed in claim 4, comprising a head-mounting plate movable in a direction towards said winding spindles, characterized by comprising first and second positioning means, responsive to the position of the head-mounting plate for alternately positioning the idler wheel into its respective inoperative position, when the idler wheel is inoperative said head-mounting plate being positioned a greater distance from the winding spindles than when the switching wheel is inoperative.

6. An apparatus as claimed in claim 5, characterized in that said switching device is a first switching device, and said apparatus further conmprises a magnetic head and a plurality of pressure rollers arranged on the head-mounting plate, a second switching device comprising a second servo wheel constituting said at least temporarily stationary body, and a recording switch; said first switching device turning the magnetic head via the servo wheel, and changing over said pressure rollers to reverse a direction of tape transport, and said second switching device changing over said recording switch via the servo wheel.

7. An apparatus as claimed in claim 2, comprising a head-mounting plate movable in a direction towards said winding spindles, characterized by comprising first and second positioning means, responsive to the position of the head-mounting plate for alternately positioning the idler wheel into its respective inoperative position, when the idler wheel is inoperative said head-mounting plate being positioned a greater distance from the winding spindles than when the switching wheel is inoperative.

8. An apparatus as claimed in claim 7, characterized in that said switching device is a first switching device, and said apparatus further comprises a magnetic head and a plurality of pressure rollers arranged on the head-mounting plate, a second switching device comprising a second servo wheel constituting said at least temporarily stationary body, and a recording switch; said first switching device turning the magnetic head via the servo wheel, and changing over said pressure rollers to reverse a direction of tape transport, and said second switching device changing over said recording switch via the servo wheel.

9. An apparatus as claimed in claim 2, characterized in that said switching device is a first switching device, and said apparatus further comprises a magnetic head and a plurality of pressure rollers arranged on the head-mounting plate, a second switching device comprising a second servo wheel constituting said at least temporarily stationary body, and a recording switch; said first switching device turning the magnetic head via the servo wheel, and changing over said pressure rollers to reverse a direction of tape transport, and said second switching device changing over said recording switch via the servo wheel.

10. A magnetic tape apparatus comprising:

at least one switching device for switching an apparatus function, comprising a servo wheel rotatable about an axis of rotation, two winding spindles having respective lower end portions, and a respective coaxial winding wheel connected to each spindle, a reversible drive motor, and means for coupling said motor to a respective winding wheel when the apparatus is in an operating condition, said means including an idler wheel arranged rotatably about an idler axis between said winding wheels, and means for moving said idler wheel between an inoperative position free of engagement with either winding wheel, and a selected one of two operating positions in engagement with one or the other winding wheel, a coupling wheel, and means, responsive to said apparatus being in a switching condition, for coupling said idler wheel to said coupling wheel to form a coupling between the drive motor and the switching device so as to activate said switching device to switch the apparatus function, characterized in that the apparatus further comprises a servo member movable between a first position and a second position, and means including a latching spring for urging said member into said first position by the force of said spring, in said first position said member locking said servo wheel in a latched position against rotation; and in the second position said member releasing said servo wheel to switch the apparatus function, means for switching the drive motor between first and second operating voltage levels, at the first level the motor producing a higher torque than at the second level, a latching member for latching the servo wheel during rotation of the coupling wheel in a first direction, and releasing the servo wheel during rotation of the coupling wheel in an opposite second direction such that the coupling wheel drives the servo wheel, and a switching member forming part of said switching device, and having an internal friction such that force required for actuating the switching member is produced by the drive motor via the coupling wheel only if the motor operates at the higher torque level.

11. An apparatus as claimed in claim 10, characterized in that said switching device is a first switching device and said servo wheel is a first servo wheel latchable by said servo member, and the apparatus further comprises a second switching device comprising a second servo wheel, latchable by said latching member and constituting an at least temporarily stationary body with which the coupling wheel is in contact, arranged such that, as the coupling wheel rotates in a first direction, the coupling wheel rolls along the body, and urges the servo member towards the second position, the force exerted on the servo member by the coupling wheel being only large enough to overcome the force on the latching spring when the motor is switched to the first level torque.

12. An apparatus as claimed in claim 11, characterized by comprising an axially movable switching wheel arranged in a transmission path from said drive motor to said coupling wheel, said coupling wheel and said switching wheel being carried on said servo member, said switching wheel being movable to an inoperative position for interrupting drive to the coupling wheel.

13. An apparatus as claimed in claim 12, characterized in that said servo member is a lever having first and second arms having respective free ends, arranged to be pivotable against the force of the latching spring; the coupling wheel and the switching wheel are disposed at the free end of the first arm; and the free end of the second arm includes means for keeping the first servo wheel in said latched position.

14. An apparatus as claimed in claim 13, characterized in that said first servo wheel includes a stop projection, and at its free end the second arm comprises two latching projections, radially spaced from each other relative to the axis of rotation of the first servo wheel, for latching said stop projection.

15. An apparatus as claimed in claim 14, comprising a head-mounting plate movable in a direction towards said winding spindles, characterized by comprising first and second positioning means, responsive to the position of the head-mounting plate for alternately positioning the idler wheel into its respective inoperative position, when the idler wheel is inoperative said head-mounting plate being positioned a greater distance from the winding spindles than when the switching wheel is inoperative.

16. An apparatus as claimed in claim 15, characterized in that said switching device is a first switching device, and said apparatus further comprises a magnetic head and a plurality of pressure rollers arranged on the head-mounting plate, a second switching device and a recording switch; said first switching device turning the magnetic head via the second servo wheel, and changing over said pressure rollers to reverse a direction of tape transport, and said second switching device changes over said recording switch via the second servo wheel.

17. An apparatus as claimed in claim 12, conmprising a head-mounting plate movable in a direction towards said winding spindles, characterized by comprising first and second positioning means, responsive to the position of the head-mounting plate for alternately positioning the idler wheel into its respective inoperative position, when the idler wheel is inoperative said head-mounting plate being positioned a greater distance from the winding spindles than when the switching wheel is inoperative.

18. An apparatus as claimed in claim 17, characterized in that said switching device is a first switching device, and said apparatus further comprises a magnetic head and a plurality of pressure rollers arranged on the head-mounting plate, a second switching device and a recording switch; said first switching device turning the magnetic head via the second servo wheel, and changing over said pressure rollers to reverse a direction of tape transport, and said second switching device changes over said recording switch via the second servo wheel.

19. An apparatus as claimed in claim 11, characterized in that said switching device is a first switching device, and said apparatus further comprises a magnetic head and a plurality of pressure rollers arranged on the head-mounting plate, a second switching device and a recording switch; said first switching device turning the magnetic head via the second servo wheel, and changing over said pressure rollers to reverse a direction of tape transport, and said second switching device changes over said recording switch via the second servo wheel.

* * * * *